US012625276B2

(12) United States Patent
Amini et al.

(10) Patent No.: US 12,625,276 B2
(45) Date of Patent: May 12, 2026

(54) HYBRID NON-LINE-OF-SIGHT DETECTION IN WIRELESS NETWORKS

(71) Applicant: Cisco Technology, Inc., San Jose, CA (US)

(72) Inventors: Peiman Amini, Fremont, CA (US); Ardalan Alizadeh, Campbell, CA (US); Jerome Henry, Pittsboro, NC (US); Rabe Arshad, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 18/466,166

(22) Filed: Sep. 13, 2023

(65) Prior Publication Data

US 2025/0085436 A1     Mar. 13, 2025

(51) Int. Cl.
$$\begin{array}{ll} \textbf{\textit{G01S 19/22}} & (2010.01) \\ \textbf{\textit{G01S 19/48}} & (2010.01) \\ \textit{H04W 64/00} & (2009.01) \end{array}$$

(52) U.S. Cl.
CPC ............ G01S 19/22 (2013.01); G01S 19/485 (2020.05); *H04W 64/00* (2013.01)

(58) Field of Classification Search
CPC ............................... G01S 19/22; G01S 19/485
USPC ..................................................... 342/357.61
See application file for complete search history.

(56) References Cited

U.S. PATENT DOCUMENTS

| | | | | |
|---|---|---|---|---|
| 12,332,359 B2 * | 6/2025 | Tapucu | ............... | H04B 1/70755 |
| 2014/0099971 A1 | 4/2014 | Lim et al. | | |

| | | | | |
|---|---|---|---|---|
| 2021/0124058 A1 | 4/2021 | Nirula et al. | | |
| 2021/0278549 A1 * | 9/2021 | Kassas | ................... | G01S 19/485 |
| 2022/0141673 A1 * | 5/2022 | Flesch | ................. | H04W 52/243 |
| | | | | 370/329 |
| 2023/0033404 A1 * | 2/2023 | Hsu | ......................... | G01S 19/45 |

FOREIGN PATENT DOCUMENTS

| | | | | |
|---|---|---|---|---|
| CN | 116088012 A * | 5/2023 | ............. | G01S 19/37 |
| CN | 116490791 A * | 7/2023 | ........... | G01S 19/428 |

OTHER PUBLICATIONS

Wen, W., et al., "Correcting NLOS by 3D LiDAR and Building Height to Improve GNSS Single Point Positioning," Journal of the Institute of Navigation, p. 705-718, Dec. 2019.

* cited by examiner

*Primary Examiner* — Harry K Liu
(74) *Attorney, Agent, or Firm* — Rutan & Tucker, LLP; Ravi Mohan; Marc A. McClain

(57)     ABSTRACT

Devices, systems, methods, and processes for hybrid line-of-sight (LOS)/non-line of sight (NLOS) detection are described herein. To facilitate co-existence and co-operation of a fixed network and a wireless network sharing a same frequency band without interference, a device in the wireless network can be configured to perform automatic frequency coordination (AFC). The device can accurately determine a geolocation of the device by utilizing global navigation satellite system (GNSS) data and light detection and ranging (LiDAR) data. The device can also determine whether the fixed station is in the LOS by utilizing the GNSS data and the LiDAR data. The device can further correct the geolocation and improve an accuracy of the LOS/NLOS detection by using both: the GNSS data and the LiDAR data simultaneously. The device can further control an output power when the fixed station is in the LOS, thereby avoiding the interference.

20 Claims, 8 Drawing Sheets

400

RECEIVE GNSS DATA FROM SATELLITES — 410

RECEIVE SKY VIEW — 420

DIVIDE SKY VIEW INTO SUB-BLOCKS — 430

MAP GNSS DATA ON THE SUB-BLOCKS — 440

IDENTIFY BLOCKED SUB-BLOCKS THAT HAVE NO GNSS DATA — 450

CLUSTER THE BLOCKED SUB-BLOCKS — 460

GENERATE MEASURED BLOCKAGE DATA — 470

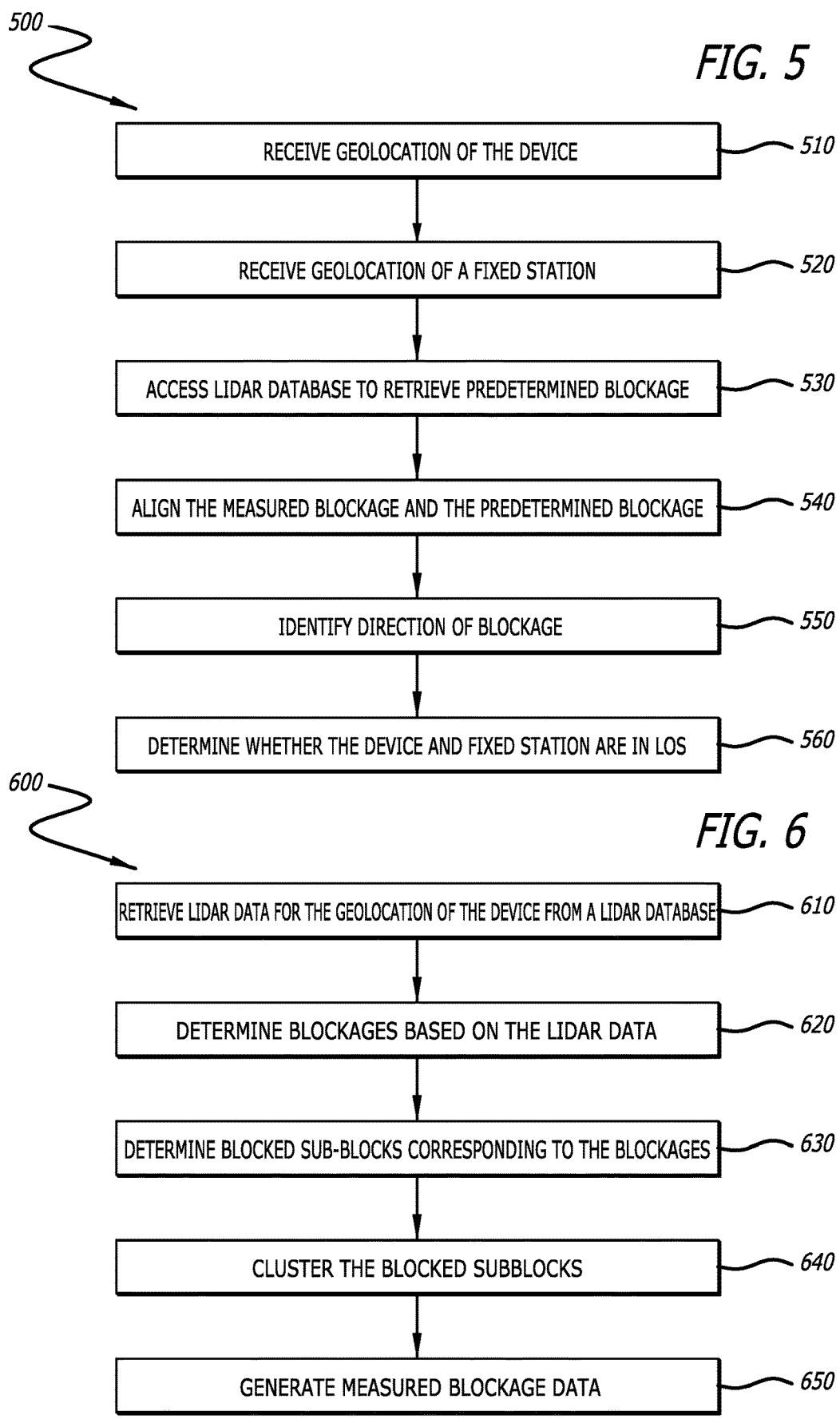

RECEIVE GEOLOCATION OF THE DEVICE — *510*

RECEIVE GEOLOCATION OF A FIXED STATION — *520*

ACCESS LIDAR DATABASE TO RETRIEVE PREDETERMINED BLOCKAGE — *530*

ALIGN THE MEASURED BLOCKAGE AND THE PREDETERMINED BLOCKAGE — *540*

IDENTIFY DIRECTION OF BLOCKAGE — *550*

DETERMINE WHETHER THE DEVICE AND FIXED STATION ARE IN LOS — *560*

RETRIEVE LIDAR DATA FOR THE GEOLOCATION OF THE DEVICE FROM A LIDAR DATABASE — *610*

DETERMINE BLOCKAGES BASED ON THE LIDAR DATA — *620*

DETERMINE BLOCKED SUB-BLOCKS CORRESPONDING TO THE BLOCKAGES — *630*

CLUSTER THE BLOCKED SUBBLOCKS — *640*

GENERATE MEASURED BLOCKAGE DATA — *650*

700

RECEIVE GNSS DATA FROM SATELLITES — 710

DETERMINE THE GEOLOCATION OF THE DEVICE — 720

RECEIVE LIDAR DATA FROM THE LIDAR DATABASE — 730

CORRECT THE GEOLOCATION OF THE DEVICE BASED ON THE LIDAR DATA — 740

800

DETERMINE A BLOCKED AREA — 810

DETERMINE AN ANGLE OF BLOCKAGE OF THE BLOCKED AREA — 820

DETERMINE A CENTER AND A WIDTH OF THE BLOCKED AREA — 830

HYBRID NON-LINE-OF-SIGHT DETECTION IN WIRELESS NETWORKS

The present disclosure relates to communication networks. More particularly, the present disclosure relates to detecting whether a network device in a wireless communication network is in a Line-of-Sight (LOS) of another communication device.

BACKGROUND

Wireless transceivers and global navigation satellite system (GNSS) receivers are commonly integrated into network devices to provide complementary services. For instance, the wireless transceivers may broadcast signals for communication operations, whereas the GNSS receivers may determine geolocation of the network device or may correct clock bias errors in the network device to aid in the communication operations. However, performance of the GNSS receivers is greatly dependent on clear visibility of sky. As a result, the performance of the GNSS receivers suffers in metropolitan settings where tall structures often block portions of the sky.

To improve the performance of the GNSS receivers, some conventional network devices use multiple antennas or antenna arrays to enhance signal separation and accuracy. Some other conventional network devices use signal processing techniques to identify and suppress multipath errors. However, all such conventional network devices are agnostic to surrounding environment. Therefore, the network devices cannot determine if there exists another network device in its line-of-sight (LOS). This may lead to conflicts in spectrum sharing or may affect quality of service (QoS) of the network devices that operate within a LOS of each other.

SUMMARY OF THE DISCLOSURE

In response to the problems described above, devices and methods are discussed herein that detect whether a network device in a wireless communication network is in a Line-of-Sight (LOS) of another communication device. In some embodiments, a device, includes a processor, a memory communicatively coupled to the processor, at least one global navigation satellite system (GNSS) receiver configured to receive GNSS data from a plurality of satellites observed over a predetermined time period, and a blockage identification logic. The logic is configured to receive a sky view indicative of an observable area of sky, divide the sky view into a plurality of sub-blocks, map the GNSS data on each of the plurality of sub-blocks, identify a first set of sub-blocks that are devoid of the GNSS data, cluster the first set of sub-blocks to generate clustered data, and generate measured blockage data based on the clustered data, wherein the measured blockage data is indicative of an area of sky devoid of observed satellites.

In some embodiments, the device further includes a blockage validation logic, configured to receive a geolocation of a fixed station and a geolocation of the device, retrieve a predetermined blockage data from a light detection and ranging (LiDAR) database based on the geolocation of the device, map the measured blockage data on the predetermined blockage data, identify a direction of blockage based on the mapping, and determine whether the fixed station is in a line-of-sight (LOS) of the device based on the direction of blockage and the geolocations of the fixed station and the device.

In some embodiments, the device further includes an optimization logic, configured to retrieve LiDAR data corresponding to the sky view from a LiDAR database, determine one or more blockages based on the retrieved LiDAR data, and identify a second set of sub-blocks corresponding to the determined blockages, wherein the clustered data is generated based on the first set of sub-blocks and the second set of sub-blocks.

In some embodiments, the LiDAR data includes high-resolution digital elevation models corresponding to the geolocation of the device.

In some embodiments, the GNSS receiver is further configured to provide the geolocation of the device based on the GNSS data.

In some embodiments, the GNSS receiver corrects the geolocation of the device based on the LiDAR data.

In some embodiments, the blockage validation logic and the optimization logic are implemented by a server.

In some embodiments, the blockage identification logic is further configured to determine a blocked area based on the clustered sub-blocks, determine an angle of blockage of the blocked area, and determine a center and a width of the blocked area based on the angle of blockage, wherein the measured blockage data is indicative of the center and width of the blocked area.

In some embodiments, clustering the first set of sub-blocks to generate the clustered data utilizes agglomerative hierarchical clustering process.

In some embodiments, a number of sub-blocks depends on a processing power of the device.

In some embodiments, an output power of the device is controlled based on whether the device is in the LOS of the fixed station.

In some embodiments, the output power of the device when the device is not in the LOS of the fixed station is higher than the output power of the device when the device is in the LOS of the fixed station.

In some embodiments, a method includes receiving global navigation satellite system (GNSS) data from a plurality of satellites observed over a predetermined time period, receiving a sky view indicative of an observable area of sky, dividing the sky view into a plurality of sub-blocks, mapping the GNSS data on each of the plurality of sub-blocks, identifying a first set of sub-blocks that are devoid of the GNSS data, clustering the first set of sub-blocks to generate clustered data, and generating measured blockage data based on the clustered data, wherein the measured blockage data is indicative of an area of sky devoid of observed satellites.

In some embodiments, a method, further includes receiving a geolocation of a fixed station and a geolocation of a device, retrieving a predetermined blockage data from a light detection and ranging (LiDAR) database based on the geolocation of the device, mapping the measured blockage data on the predetermined blockage data, identifying a direction of blockage based on the mapping, and determining whether the fixed station is in a line-of-sight (LOS) based on the direction of blockage and the geolocations of the fixed station and the device.

In some embodiments, a method, further includes retrieving LiDAR data corresponding to the sky view from a LiDAR database, determining one or more blockages based on the retrieved LiDAR data, and identifying a second set of sub-blocks corresponding to the determined blockages, wherein the clustered data is generated based on the first set of sub-blocks and the second set of sub-blocks.

In some embodiments, generating the measured blockage data includes determining a blocked area based on the clustered sub-blocks, determining an angle of blockage of the blocked area, and determining a center and a width of the blocked area based on the angle of blockage, wherein the measured blockage data is indicative of the center and width of the blocked area.

In some embodiments, a device includes a processor, a memory communicatively coupled to the processor, a blockage identification logic. The logic is configured to receive a sky view indicative of an observable area of sky, receive global navigation satellite system (GNSS) data from a plurality of satellites observed over a predetermined time period, map the GNSS data on the sky view, and generate measured blockage data based on the mapped GNSS data, wherein the measured blockage data is indicative of an area of sky devoid of observed satellites, and a blockage validation logic, configured to receive a geolocation of a fixed station and a geolocation of the device, retrieve a predetermined blockage data from a light detection and ranging (LiDAR) database based on the geolocation of the device, map the measured blockage data on the predetermined blockage data, and determine whether the fixed station is in a line-of-sight (LOS) of the device based on the mapped blockage data and the geolocations of the fixed station and the device.

In some embodiments, the measured blockage data is generated based on LiDAR data retrieved from a LiDAR database based on the geolocation of the device.

In some embodiments, the measured blockage data is indicative of a center and a width of the area of sky devoid of observed satellites.

In some embodiments, the geolocation of the device is corrected based on the LiDAR data.

In some embodiments, a device includes a processor, at least one network interface controller configured to provide access to a plurality of devices over a network, and a memory communicatively coupled to the processor, wherein the memory includes a plurality of buffers and a buffer prediction logic. The logic is configured to couple to a plurality of network devices, wherein each of the plurality of network devices includes at least one buffer, receive a plurality of buffer service report (BSR) polls from at least one network device at a first polling rate, generate a BSR based at least on the plurality of buffers, transmit the BSR to the plurality of network devices, and receive notification of an updated polling rate.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart depicting a process for determining if a device is in a line-of-sight (LOS) of a fixed station in accordance with various embodiments of the disclosure;

FIG. 6 is a flowchart depicting a process for generating measured blockage data in accordance with various embodiments of the disclosure;

Figure 1:
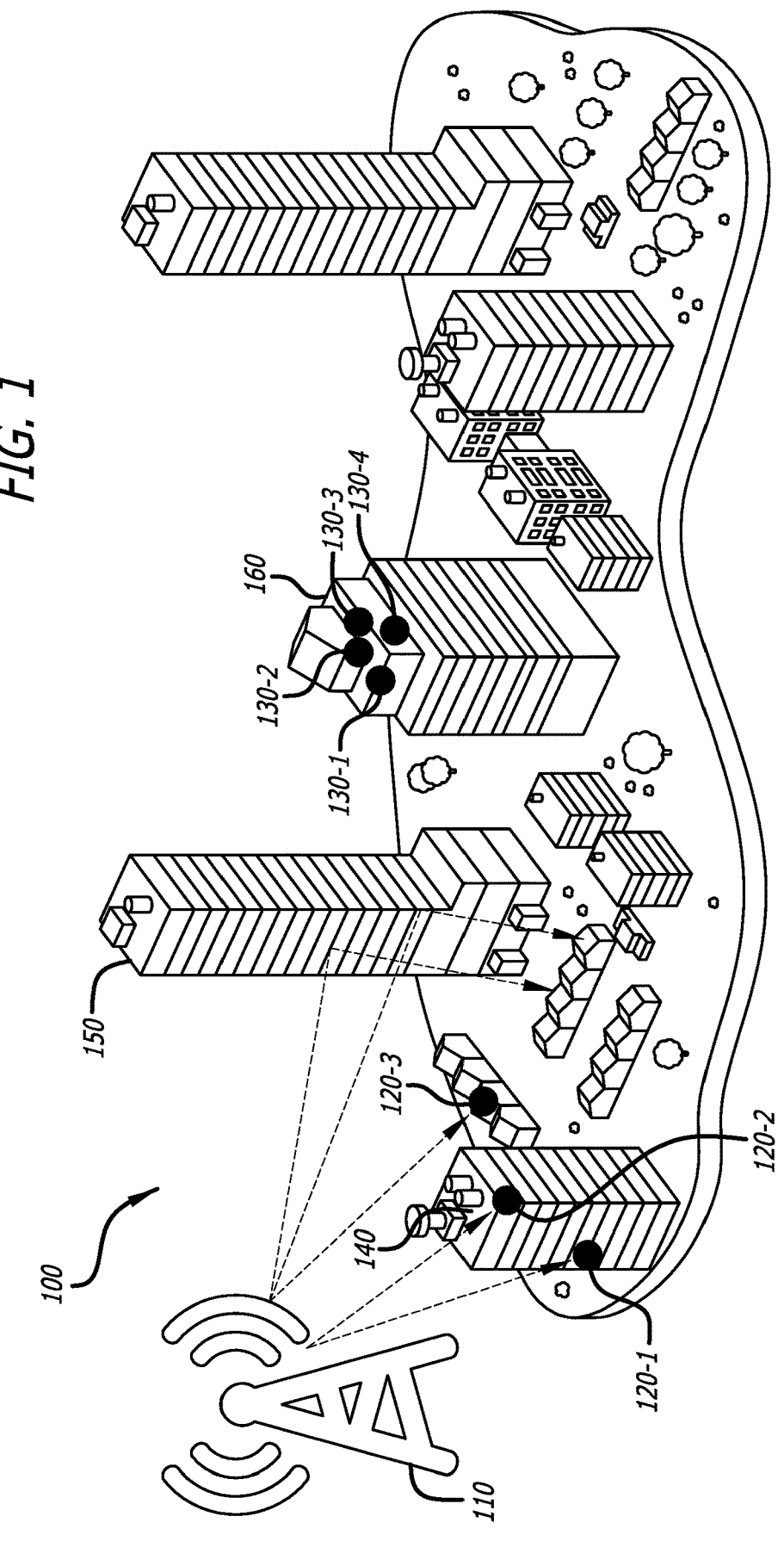
FIG. 1 is a conceptual illustration of a network depicting a line-of-sight (LOS) communication in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that utilize global navigation satellite system (GNSS) and Light Detection and Ranging (LiDAR) to determine if a device is in a line-of-sight (LOS) of a fixed station. In many embodiments, a device may utilize one or more GNSS receivers to determine a geolocation of the device and to receive GNSS data from one or more satellites for a predetermined time period. For instance, the device may receive the GNSS data over a period of 12 hours. As those skilled in the art will recognize, the device may only receive the GNSS data from those satellites that are visible to the device. For instance, the device may not receive the GNSS data from the satellites that are not in a LOS of the device due to presence of obstructions or blockages.

To measure an extent of these obstructions or blockages, the device can utilize a sky view. The sky view may indicate an observable area of sky. The device may divide the sky view into one or more sub-blocks. In many non-limiting examples, a number of sub-blocks may depend on a processing power of the device. For each sub-block, the device may determine if the GNSS receiver has received the GNSS data corresponding to the sub-block. If no GNSS data is received for the sub-block, the device may identify the sub-block as blocked. The device can cluster a set of blocked sub-blocks by utilizing agglomerative hierarchical clustering process to generate clustered data. Based on the clustered data, the device can determine a blocked area and an angle of blockage. The device can generate measured blockage data indicative of the extent of the blockage. For instance, the measured blockage data can indicate an area of sky that is devoid of any observed satellites.

To validate the extent of the blockage, the device may utilize a LiDAR database. In many embodiments, the device retrieves a predetermined blockage data from the LiDAR database based on the geolocation of the device. The LiDAR database may include high-resolution digital elevation models, including LiDAR data corresponding to the geolocation of the device. The predetermined blockage data may include information about the obstructions or blockages caused by one or more structures or objects in vicinity of the device. The device may map the measured blockage data on the predetermined blockage data to identify a direction in which the blockage exists. To accurately determine if the device is in the LOS of a fixed station at a given geolocation, the device may utilize the direction of the blockage and the geolocations of the fixed station and the device. For instance, the device may determine that the fixed station is not in the LOS if the direction of the blockage aligns with a direction of the fixed station from the device.

To improve an accuracy of the validation of the extent of the blockage, the device can filter reflected GNSS data received from the satellites that are not in the LOS of the device. In many embodiments, the device may retrieve the LiDAR data corresponding to the geolocation of the device from the LiDAR database. The LiDAR data may indicate one or more portions of the sky view that are blocked. The device may determine one or more sub-blocks corresponding to the blocked portions of the sky view. The device may also include these sub-blocks in the set of blocked sub-blocks. As a result, an accuracy of identifying the blocked sub-blocks is enhanced by utilizing the LiDAR data. This may further lead to an improvement in an accuracy of determining whether the fixed station is in the LOS of the device.

To avoid interference in an operation of the fixed station, the device may control an output power based on whether the device is in the LOS of the fixed station. For instance, the device may provide higher output power if the fixed station is not in the LOS of the device. And consequently, the device may lower the output power if the fixed station is in the LOS. As a result, the device can avoid interfering the operation of the fixed station when the fixed station is in the LOS of the device, thereby ensuring co-existence and co-operation of the device and the fixed station.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. In many non-limiting examples, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100 depicting a line-of-sight (LOS) communication in accordance with various embodiments of the disclosure is shown. The network 100 can include a fixed station 110, first through third devices 120-1, 12-2, and 120-3 (also collectively referred to as "first set of devices 120") and fourth through seventh devices 130-1, 130-2, 130-3, and 130-4 (also collectively referred to as "second set of devices 130"). In many embodiments, the network 100 can be a wired network, a wireless network, or a combination of both: wired and wireless networks. In further embodiments, the first set of devices 120 and the second set of devices may be network devices. Examples of the network devices include but are not limited to access points, routers, switches, etc. The fixed station 110 may be a legacy network device or an incumbent network device. Common examples of the fixed station 110 include but are not limited to a television broadcast station or a satellite service station. More non-limiting examples of the fixed station 110 may include a microwave communication network device used by public utilities, a backhaul for cell towers, or a network device for long distance telephone link. The network 100 may operate in a geographical area having one or more structures. Many more examples of the structures include but are not limited to buildings, houses, bridges, or sheds etc.

In an embodiment depicted in FIG. 1, the first device 120-1 and the second device 120-2 may be located in a first building 140, and the third device 120-3 may be located between the first building 140 and a second building 150. The second set of devices 130 may be located in a third building 160. In some embodiments, the first set of devices 120 can be in a line-of-sight (LOS) of the fixed station 110. In some more embodiments, the second set of devices 130 can be out of the LOS of the fixed station 110.

In many embodiments, the network 100 may be a Wireless Fidelity (Wi-Fi) network operating on predefined bands of frequencies. Examples of the predefined bands of frequencies include but are not limited to 2.4 GHz, 5 GHz, or 6 GHz bands. In several embodiments, the first set of devices 120 and the fixed station 110 can operate on a same band of frequencies. In this case, there is a possibility that the operation of first set of devices 120 may cause interference in the operation of the fixed station 110. As a result, an output power of the first set of devices 120 can be lowered to avoid the interference in the operation of the fixed station 110. In several more embodiments, the second set of devices 130 may also operate on the same band of frequencies. However, the operation of the second set of devices 130 may not interfere in the operation of the fixed station 110 because the second set of devices 130 are not in the LOS of the fixed station 110. As a result, an output power of the second set of devices 130 can be increased without causing the interference in the operation of the fixed station 110.

Although a specific embodiment for the network 100 depicting the LOS communication suitable for carrying out the various steps, processes, methods, and operations described herein is discussed with respect to FIG. 1, any of a variety of systems and/or processes may be utilized in accordance with embodiments of the disclosure. In many non-limiting examples, the network 100 can include the first set of devices 120 in the LOS of the fixed station 110 and the second set of devices 130 out of the LOS of the fixed station, thereby requiring the first set of devices 120 to operate on a lower power to avoid the interference in the operation of the fixed station 110 and allowing the second set of devices 130 to operate on a higher power without causing the interference in the operation of the fixed station 110. The aspects depicted in FIG. 1 may also be interchangeable with other elements of FIGS. 2-10 as required to realize a particularly desired embodiment.

Figure 2:
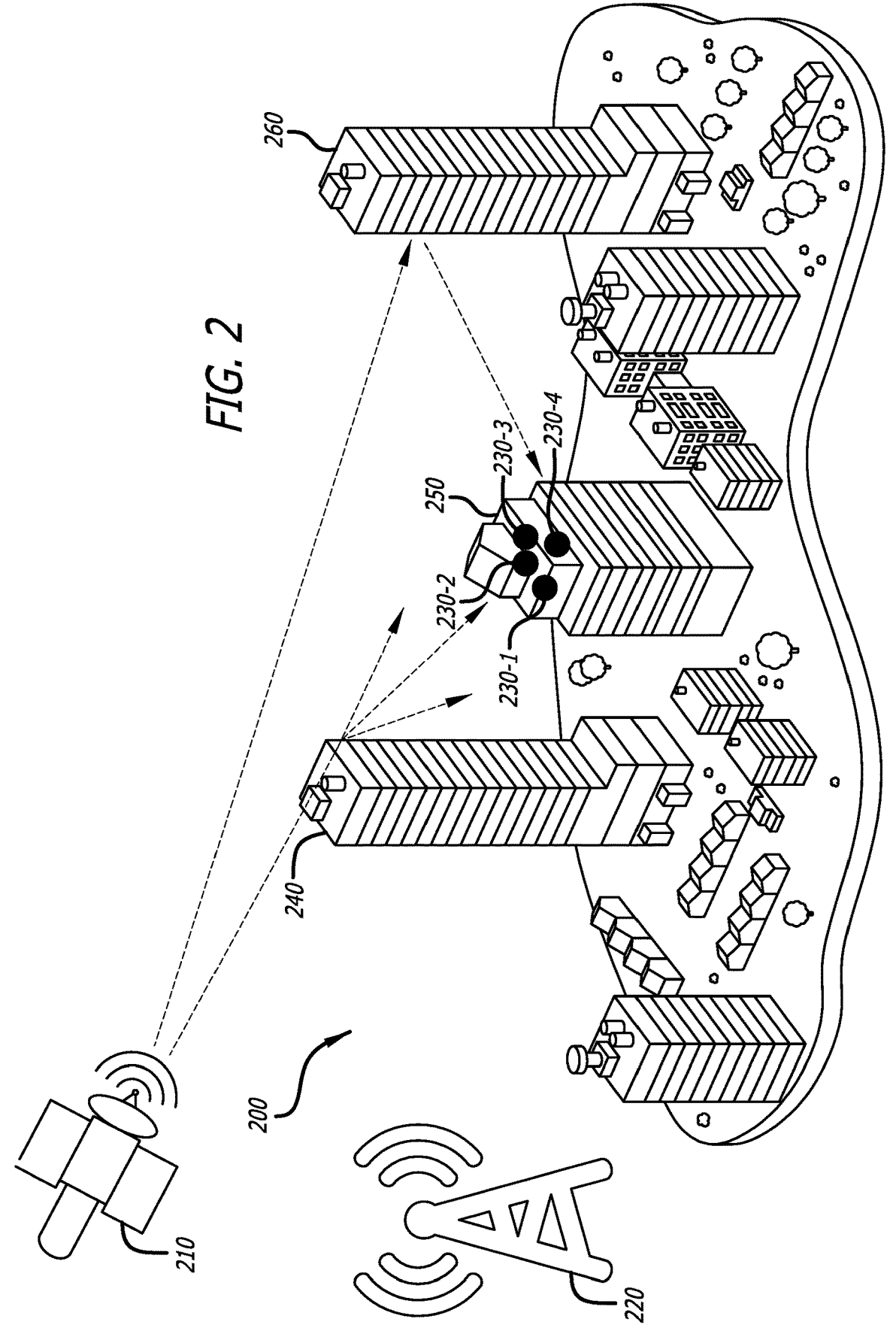
FIG. 2 is a conceptual illustration of a network depicting a non-line-of-sight (NLOS) communication in accordance with various embodiments of the disclosure.

Referring to FIG. 2, a conceptual illustration of a network 200 depicting non-line-of-sight (NLOS) communication in accordance with various embodiments of the disclosure is shown. The network 200 can include a satellite 210, a fixed station 220, and a plurality of devices 230-1, 230-2, 230-3, and 230-4 (also referred to as "device 230" for simplicity).

In many embodiments, the network 200 can be a wired network, a wireless network, or a combination of both: wired and wireless networks. In many more embodiments, the device 230 may be a network device, for instance, an access point. The fixed station 110 can be a legacy network device or an incumbent network device, for instance, a television broadcast station, a satellite service station, a microwave communication network device used by public utilities, a backhaul for cell towers, or a network device for long distance telephone link. The network 200 may operate in a geographical area having one or more structures, for instance, buildings, houses, bridges, or sheds etc. To determine an operating frequency band and an output power on which the device 230 can operate without interfering with an operation of the fixed station 220, it may be pertinent to determine whether the device 230 is in the LOS of the fixed station 220.

The device 230 may include at least one GNSS receiver, a processor, and a memory. The GNSS receiver can be configured to determine a geolocation of the device 230. The GNSS receiver can also be configured to receive data from satellites for a predetermined time period. In many non-limiting examples, the GNSS receiver may receive the GNSS data from satellites for a time period of 12 hours. The device 230 may store the GNSS data in the memory. The device 230 can receive a sky view that indicates an area of sky observable from the geolocation of the device 230. The device 230 may identify obstructions or blockages in a vicinity of the device 230 based on the sky view and the GNSS data as will be discussed in detail below with respect to FIG. 4. The device 230 can also utilize a light detection and ranging (LiDAR) database to determine if the device

230 is in the LOS of the fixed station 220 as will be discussed in detail below with respect to FIG. 5. The device 230 may also utilize the LiDAR database to correct the GNSS receiver as will be discussed in detail below with respect to FIG. 7. The device 230 can further improve an accuracy of determination of the blockage by utilizing the LiDAR database as will be discussed in detail below with respect to FIG. 6. Therefore, the device 230 may use the LiDAR database in multiple ways to determine if the device 230 is in the LOS of the fixed station 220 and to further improve an accuracy of the determination of the LOS, thereby providing hybrid detection of the LOS of the device 230.

Although a specific embodiment for the network 200 depicting the NLOS communication suitable for carrying out the various steps, processes, methods, and operations described herein is discussed with respect to FIG. 2, any of a variety of systems and/or processes may be utilized in accordance with embodiments of the disclosure. In many non-limiting examples, the device 230 in the network 200 may utilize the GNSS data and the LiDAR database simultaneously to provide hybrid detection of the LOS of the device 230. The elements depicted in FIG. 2 may also be interchangeable with other elements of FIGS. 1 and 3-10 as required to realize a particularly desired embodiment.

Figure 3:
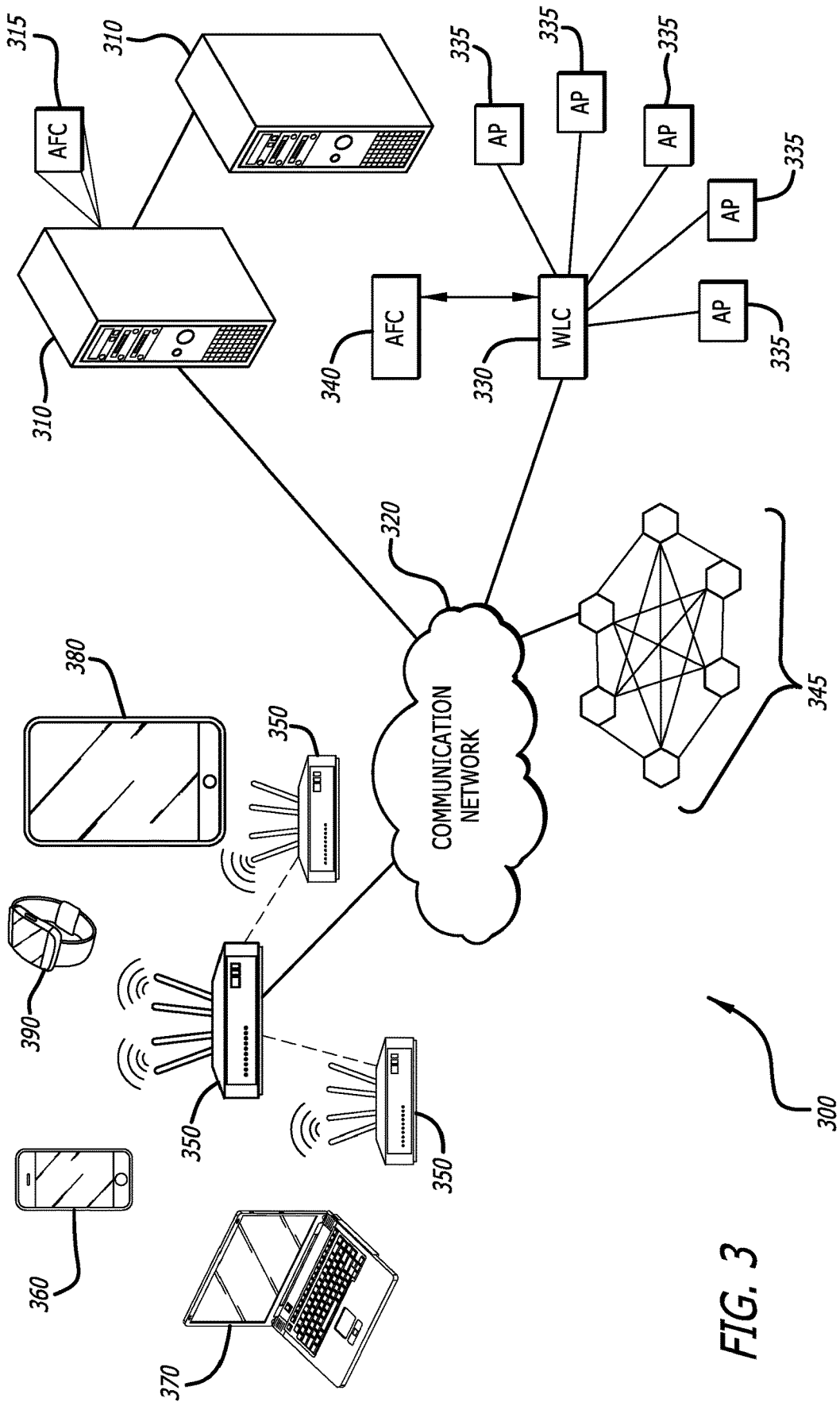
FIG. 3 is a conceptual network diagram of a various environments that an automatic frequency coordinator (AFC) may operate on a plurality of network devices in accordance with various embodiments of the disclosure.

Referring now to FIG. 3, a conceptual network diagram 300 of a various environment that an automatic frequency coordinator (AFC) may operate on a plurality of network devices in accordance with various embodiments of the disclosure is shown. The AFC may operate on one or more servers 310 connected to a network 320. The network 320 can be a wired network or a wireless network. In many embodiments, the network 320 may be a Wi-Fi network operating on 6 GHz frequency band. In many more embodiments, the 6 GHz frequency band can also be utilized by multiple external networks and fixed stations. Therefore, it is pertinent for the network 320 to ensure co-operation with the external networks and fixed stations operating on the same frequency band. To ensure co-operation, the network 320 may utilize the AFC to determine if there exists an external network or a fixed station in the LOS. Those skilled in the art will recognize that the AFC can be comprised of various hardware and/or software deployments and can be configured in a variety of ways. In many non-limiting examples, the AFC can be configured as a standalone device, exist as a logic in another network device, be distributed among various network devices operating in tandem, or remotely operated as part of a cloud-based network management tool. In further embodiments, the servers 310 can be configured with or otherwise operate an AFC 315. The AFC 315 can be provided as a cloud-based service that can service remote networks, such as, but not limited to a deployed network 345. In many embodiments, the AFC 315 can be a logic that receives the geolocation data from one or more devices in the deployed network 345 and determines if the devices are in the LOS of the external networks or fixed stations.

However, in additional embodiments, the AFC may be operated as a distributed logic across multiple network devices. In the embodiment depicted in FIG. 3, a plurality of network access points (APs) 350 can operate as the AFC in a distributed manner or may have one specific device operate as the AFC for all of the neighboring or sibling APs 350. That is, the APs 350 may be AFC-enabled APs. The AFC-enabled APs can facilitate Wi-Fi connections at 6 GHz for various electronic devices, such as but not limited to mobile computing devices including laptop computers 370, cellular phones 360, portable tablet computers 380 and wearable computing devices 390.

In further embodiments, the AFC may be integrated within another network device. In the embodiment depicted in FIG. 3, a wireless LAN controller (WLC) 330 may have an integrated AFC 340 that the WLC 330 can use to control frequency and power of Wi-Fi communication within the various APs 335 that the WLC 330 is connected to, either wired or wirelessly. In this way, the APs 335 can facilitate Wi-Fi communication at 6 Gz at a higher power when no external network or fixed station is in the LOS of the APs 335. In many embodiments, the APs 335 can query the integrated AFC 340. The APs 335 can also provide the geolocation of the APs 335 and the measured blockage data to the integrated AFC 340. The integrated AFC 340 may validate the measured blockage data and determine the LOS of the APs 335. Based on the LOS, the integrated AFC 340 may also provide a response to the APs 335 to indicate whether the APs 335 may communicate at 6 GHz at the higher power.

Although a specific embodiment for various environments that the AFC may operate on a plurality of network devices suitable for carrying out the various steps, processes, methods, and operations described herein is discussed with respect to FIG. 3, any of a variety of systems and/or processes may be utilized in accordance with embodiments of the disclosure. In many non-limiting examples, the AFC may be provided as a device or software separate from the APs or the AFC may be integrated into the APs. The elements depicted in FIG. 3 may also be interchangeable with other elements of FIGS. 1-2 and 4-10 as required to realize a particularly desired embodiment.

Figure 4:
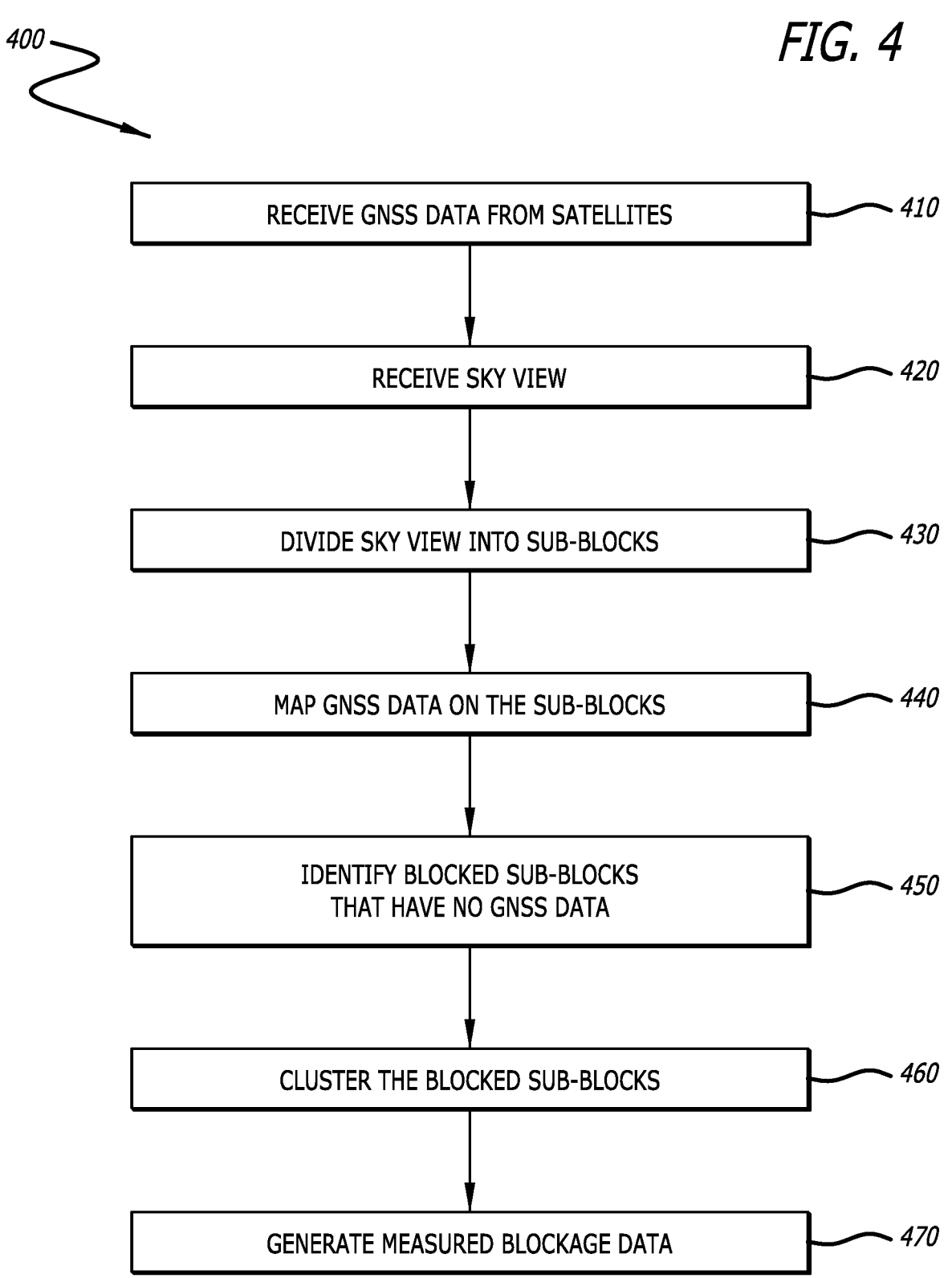
FIG. 4 is a flowchart depicting a process for generating measured blockage data in accordance with various embodiments of the disclosure.

Referring now to FIG. 4, a flowchart depicting a process 400 for generating measured blockage data in accordance with various embodiments of the disclosure is shown. In many embodiments, the process 400 can receive the GNSS data from the satellites observed over the predetermined time period (block 410). In many non-limiting examples, the GNSS data can be received over the period of 12 hours. The GNSS data may be received directly from the satellites or indirectly by way of reflection. Many non-limiting examples of GNSS systems include Global Positioning System (GPS), GLObalnaya NAvigatsionnaya Sputnikovaya (GLONASS), Galileo, BeiDou, or NavIC etc. The process 400 can utilize the GNSS receiver of the device to receive the GNSS data. In further non-limiting examples, the GNSS receiver receives GNSS data on one or more of the L frequency bands. The process 400 can also store the GNSS data in the memory of the device. In many more non-limiting examples, the GNSS data may include one or more of: pseudorandom codes, navigation message, carrier frequency, modulation data, ephemeris data, almanac data, clock corrections, status and health information, encryption and authentication information, or signal strength and quality indicators etc.

In many embodiments, the process 400 may receive the sky view (block 420). In many non-limiting examples, the sky view can be an image indicative of sky or an observable area of sky. For instance, the sky view may include a portion of celestial hemisphere visible from the location of the device, which represents unobstructed view of the satellites as well as the obstructions that block the view of the satellites. Further non-limiting examples of the obstructions include trees or tall buildings. The process 400 may also store the sky view in the memory of the device.

In many more embodiments, the process 400 can divide the sky view into multiple sub-blocks (block 430). In various embodiments, a number of the sub-blocks or a size of the sub-blocks can depend on a processing capability or a processing power of the device. In further embodiments, the device may use image one or more segmentation or decomposition image processing techniques to divide the sky view into the sub-blocks. As may be understood by a person skilled in the art, an accuracy of identification of the obstructions or blockages can be improved by increasing the number of sub-blocks.

In more embodiments, the process 400 may also map the GNSS data on the sub-blocks (block 440). In many embodiments, the process 400 can map the GNSS data on every sub-block. The mapping may include projecting one or more of satellite positions, satellite IDs, elevation, and azimuth angles, or other GNSS data on the sky view. The mapping may also represent the satellite positions with respect to celestial or terrestrial landmarks.

In various embodiments, the process 400 can also identify the blocked sub-blocks (block 450). If there is no GNSS data corresponding to a sub-block, the process 400 can classify the sub-block as a blocked sub-block. In further embodiments, every sub-block of the sky view is classified as either a blocked sub-block or an un-blocked sub-block. The un-blocked sub-blocks indicate a clear view of the sky, and hence, do not have any obstructions or blockages.

In additional embodiments, the process 400 may cluster the blocked sub-blocks (block 460). The process 400 can cluster the blocked sub-blocks to generate clustered data. Since a number of clusters are not known, the process 400 can utilize an agglomerative hierarchical clustering process to generate the clustered data. In further embodiments, the clustering may include extracting one or more features of the sub-blocks, identifying one or more features of the obstructions in the sub-blocks, and grouping the sub-blocks with identical features. In more non-limiting examples, the process 400 may use various types of clustering techniques, for instance, K-means clustering, density-based clustering, distribution-based clustering, or fuzzy clustering etc.

In several embodiments, the process 400 may also generate the measured blockage data based on the clustered data (block 470). The measured blockage data may indicate the area of sky devoid of observed satellites. The measured blockage data can indicate permanent obstructions such as buildings and structures, trees and vegetation, terrain and topography, natural landforms, or urban canyons that are visible to the device. The measured blockage data can also indicate temporary obstructions such as moving vehicles, construction equipment etc. The measured blockage data may further indicate one or more atmospheric conditions such as rain, fog, smog, dust storms that affect the sky view. The measured blockage data can also further indicate electronic interference that affects the reception of the satellite signals, for instance, electronic equipment, power lines, or electromagnetic interference sources, etc.

Although a specific embodiment for determining the measured blockage data for carrying out the various steps, processes, methods, and operations described herein is discussed with respect to FIG. 4, any of a variety of systems and/or processes may be utilized in accordance with embodiments of the disclosure. In many non-limiting examples, the process 400 can determine the extent of the blockage faced by the device based on the GNSS data received from the observed satellites. The elements depicted in FIG. 4 may also be interchangeable with other elements of FIGS. 1-3 and 5-9 as required to realize a particularly desired embodiment.

Referring now to FIG. 5, a flowchart depicting a process 500 for determining if a device is in the LOS of the fixed station in accordance with various embodiments of the disclosure is shown. In many embodiments, the process 500 can receive the geolocation of the device (block 510). In further embodiments, the device of the process 500 determines the geolocation by utilizing the GNSS receivers. In more embodiments, the AFC of the process 500 may receive the geolocation of the device by way of the network. In further non-limiting examples, the geolocation may include one or more of latitude and longitude of the device, altitude of the device, timestamp of when the geolocation was recorded or updated, accuracy or precision of the geolocation, device identifier of the device, or additional contextual metadata.

In further embodiments, the process 500 may receive the geolocation of the fixed station (block 520). In many embodiments, the process 500 can retrieve the geolocation of the fixed station from a database. In many non-limiting examples, the database may be maintained by an organization, an entity, or a government, for instance, Antenna Structure Registration (ASR) Database maintained by the Federal Communications Commission (FCC) or List of Terrestrial Broadcasting Stations by International Telecommunication Union (ITU) etc.

In more embodiments, the process 500 can access the LiDAR database to retrieve a predetermined blockage based on the geolocation of the device (block 530). The LiDAR database may include high-resolution digital elevation models of various geographical locations. The process 500 can retrieve the predetermined blockage based on the high-resolution digital elevation model of the geographical location of the device. In further non-limiting examples, the LiDAR database may be maintained by an organization, an entity, or a government, for instance, United States Interagency Elevation Inventory (USIEI) by United States Geological Survey (USGS) National Geospatial Program or National Oceanic and Atmospheric Administration (NOAA) Digital Coast database. The LiDAR database may further include high-accuracy topographic data such as LiDAR and Interferometric synthetic aperture radar (IfSAR), and bathymetric data including hydrographic surveys, multibeam data, and bathymetric LiDAR.

In various embodiments, the process 500 may also map the measured blockage data on the predetermined blockage data (block 540). In many embodiments, the process 500 can align blockage indicated by the measured blockage data with a blockage indicated by the predetermined blockage data. In further embodiments, the mapping may include identifying height and location of various obstructions based on the LiDAR data and analyzing which portions of the sky view are obstructed by the various obstacles based on the height of the obstructions. In more embodiments, the mapping can also include aligning a LiDAR point-cloud that accurately represents the obstacles with the corresponding sub-blocks of the sky view.

In even more embodiments, the process 500 may identify a direction of the blockage (block 550). In many embodiments, the process 500 can identify the direction of the blockage based on an overlapping area between the measured blockage and the predetermined blockage. In many embodiments, the overlapping area may be determined based on the point cloud processing of the LiDAR data and the sky view analysis based on the GNSS data. In many examples, the point cloud processing and the sky view analysis may be performed in real-time. In further non-limiting examples, the accuracy and precision of the overlapping area is improved by utilizing high resolution LiDAR data and efficient GNSS data processing techniques.

In various embodiments, the process 500 may determine whether the device and the fixed station are in the LOS (block 560). In many embodiments, the process 500 can determine whether the direction of the blockage aligns with the direction of the fixed station from the device. If the direction of the blockage aligns with the direction of the fixed station from the device, the process 500 can determine that the device and the fixed station are not in the LOS. However, if the direction of the blockage does not align with the direction of the fixed station from the device, the process 500 can determine that the fixed station and the device are in the LOS.

Although a specific embodiment for determining whether the device and the fixed station are in the LOS for carrying out the various steps, processes, methods, and operations described herein is discussed with respect to FIG. 5, any of a variety of systems and/or processes may be utilized in accordance with embodiments of the disclosure. In many non-limiting examples, the process 500 can facilitate hybrid LOS/NLOS determination by utilizing both: the LiDAR data and the GNSS data. The elements depicted in FIG. 5 may also be interchangeable with other elements of FIGS. 1-4 and 6-9 as required to realize a particularly desired embodiment.

Referring to FIG. 6, a flowchart depicting a process 600 for generating the measured blockage data in accordance with various embodiments of the disclosure is shown. In many embodiments, the process 600 may retrieve the LiDAR data corresponding to the geolocation of the device from the LiDAR database (block 610). In more embodiments, the LiDAR data indicates one or more blocked areas of the sky view with respect to the geolocation of the device. In further embodiments, the process 600 is utilized to refine or improve the accuracy or precision of the geolocation of the device.

In various embodiments, the process 600 may determine one or more blockages based on the LiDAR data (block 620). In further embodiments, the blockages may indicate objects or structures in the vicinity of the device. In more embodiments, determining blockages based on LiDAR data can include processing LiDAR point clouds. The processing of LiDAR point clouds can include one or more of the following technical steps: identifying ground points and creating a digital elevation model of the terrain based on the point cloud, utilizing segmentation techniques to identify clusters of points that correspond to the obstructions such as buildings, determining heights of the obstructions, and classifying the obstructions.

In several more embodiments, the process 600 can determine one or more sub-blocks of the sky view that correspond to the blockages indicated by the LiDAR data (block 630). The process 600 may classify the sub-blocks as blocked sub-blocks. In many embodiments, the process 600 may compare the sky view with the LiDAR data by utilizing an image processing method. In many non-limiting examples, eliminating the blocks sub-blocks based on the LiDAR data minimizes the multipath errors in the satellite signals caused by reflection of the satellite signals by the obstructions such as buildings or trees.

In many embodiments, the process 600 may also cluster the blocked sub-blocks (block 640). The process 600 may further generate the clustered data. Since the process 600 can utilize the LiDAR data to generate the clustered data, the accuracy of clustering can be further improved. For instance, the blocks identified as obstructions based on the LiDAR data can be eliminated by classifying as blocked sub-blocks. Since the blocked sub-blocks are clustered, the inaccuracy in the geolocation caused by multipath propagation is reduced, thereby increasing the precision of the geolocation of the device.

In many more embodiments, the process 600 can also generate the measured blockage data based on the clustered data (block 650). In further embodiments, the process 600 may be utilized to further improve accuracy of previous measured blockage data. Refining the geolocation of the device can reduce the effect of various types of errors such as, but not limited to, multipath errors, timing errors, carrier-phase ambiguities, or reflected signals.

Although a specific embodiment for generating the measured blockage data for carrying out the various steps, processes, methods, and operations described herein is discussed with respect to FIG. 6, any of a variety of systems and/or processes may be utilized in accordance with embodiments of the disclosure. In many non-limiting examples, the process 600 may improve the accuracy of the measured blockage data by utilizing the LiDAR data. The elements depicted in FIG. 6 may also be interchangeable with other elements of FIGS. 1-5 and 7-9 as required to realize a particularly desired embodiment.

Figure 7:
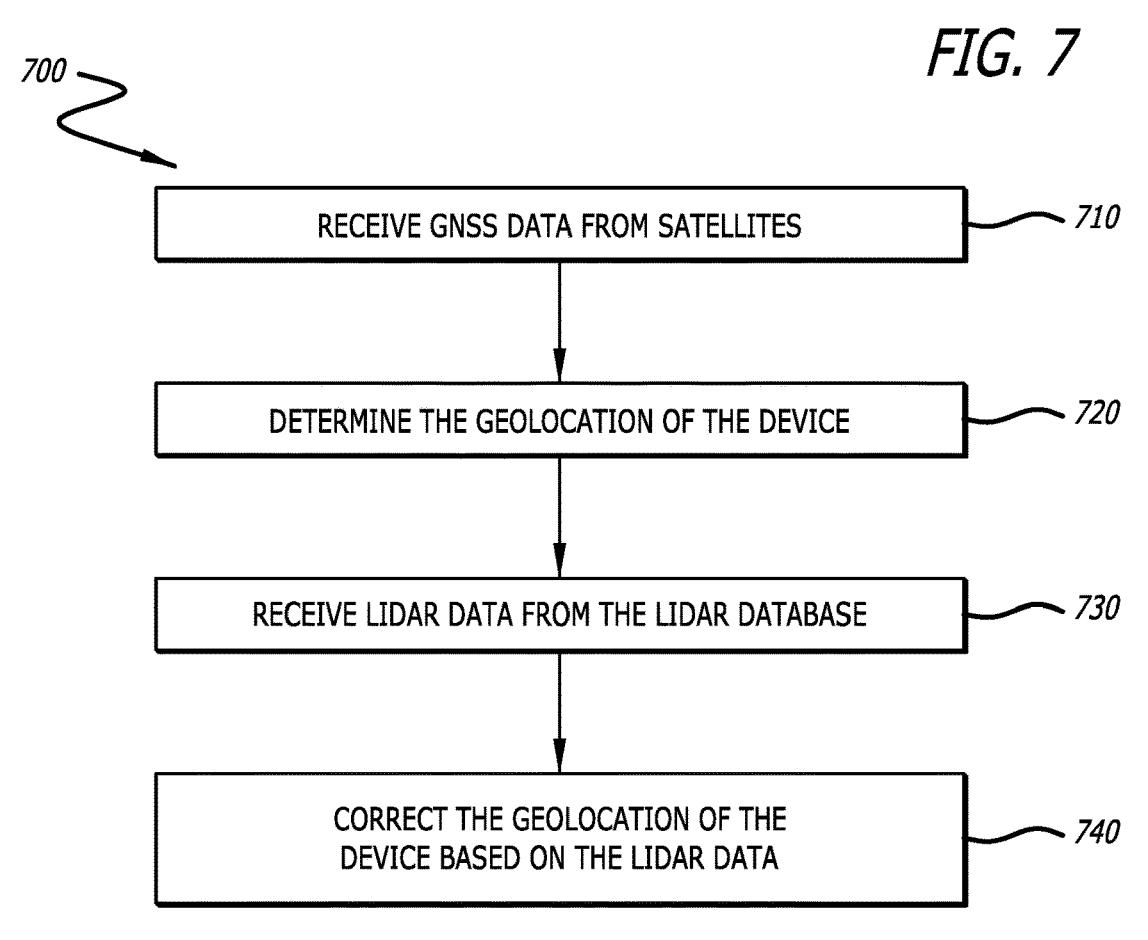
FIG. 7 is a flowchart depicting a process for correcting a geolocation of a device in accordance with various embodiments of the disclosure.

Referring to FIG. 7, a flowchart depicting a process 700 for correcting the geolocation of the device in accordance with various embodiments of the disclosure is shown. In many embodiments, the process 700 can receive the GNSS data from the satellites (block 710). The GNSS data may be configured to be broadcast out generally which can be received by various devices and other processes. However, in additional embodiments, the GNSS data can be transmitted directly to a specific destination device or location.

In a variety of embodiments, the process 700 may determine the geolocation of a device based on the GNSS data received from the satellites (block 720). In some embodiments, this determination may be done to a specific degree of certainty, such that a given range or zone of an area is determined. In further embodiments, the determination can be associated with a given time period such that the location is taken periodically.

In a number of embodiments, the process 700 can receive the LiDAR data from the LiDAR database (block 730). In still more embodiments, the LiDAR database may be remotely located, such as, but not limited to, a cloud-based database. In some embodiments, the LiDAR data may be configured as an update to previously stored data, such that a delta or difference data is received to update the previously stored data, instead of receiving new data each time it is received.

In numerous embodiments, the process 700 may further correct the geolocation of the device based on the LiDAR data (block 740). In certain embodiments, this correction can be done in response to a threshold or difference being determined. In some embodiments, the correction may be transmitted to additional devices and/or databases as needed.

Although a specific embodiment for correcting the geolocation of the device for carrying out the various steps, processes, methods, and operations described herein is discussed with respect to FIG. 7, any of a variety of systems and/or processes may be utilized in accordance with embodiments of the disclosure. In further non-limiting examples, the process 700 may improve the accuracy of determining the geolocation of the device. The elements depicted in FIG. 7 may also be interchangeable with other elements of FIGS. 1-6 and 8-9 as required to realize a particularly desired embodiment.

Figure 8:
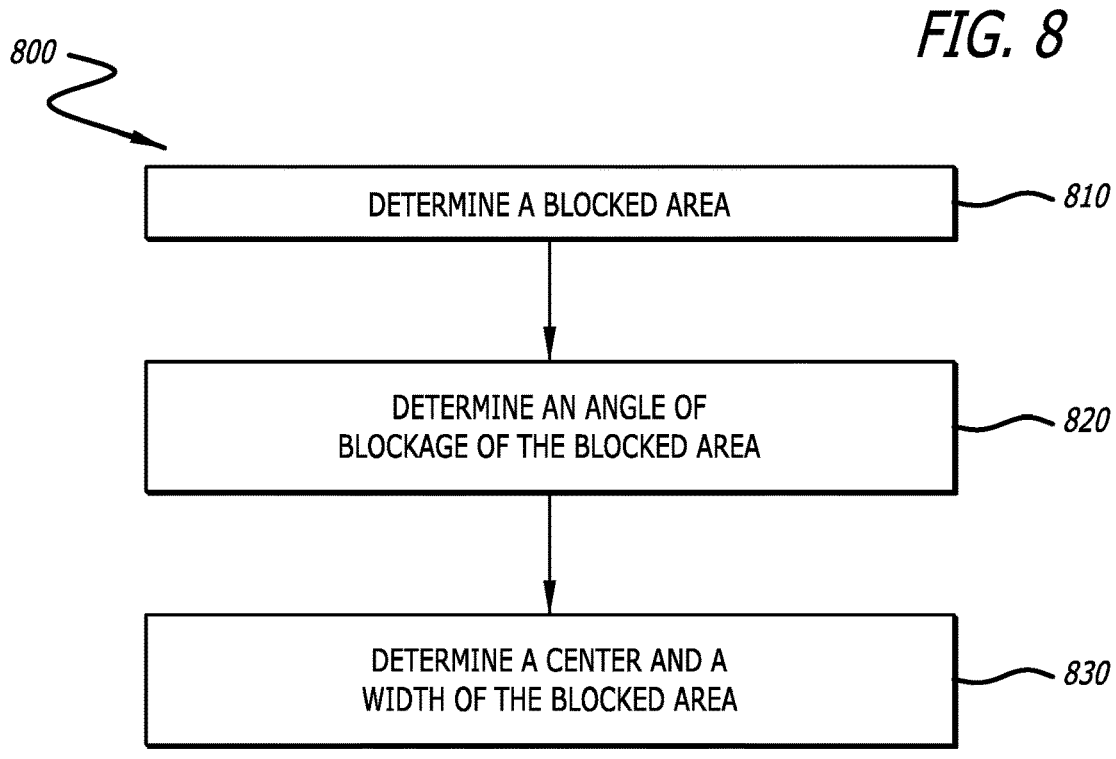
FIG. 8 is a flowchart depicting a process for determining an extent of a blocked area in accordance with various embodiments of the disclosure.

Referring to FIG. 8, a flowchart depicting a process 800 for determining the extent of the blocked area in accordance with various embodiments of the disclosure is shown. In many embodiments, the process 800 may determine the blocked area based on the clustered data (block 810). In many non-limiting examples, the blocked area may be determined based on one or more techniques such as, but not limited to, blocking assessment, pixel analysis, or quantification. In blocking assessment, the areas of the sky view that are blocked by the obstructions can be determined by comparing known dimensions and positions of the obstructions with the parts of the sky view. The corresponding pixels of the sky view may be processed and quantified to determine the extent of the blockage. In further non-limiting examples, a percentage of blockage may be determined by dividing a number of blocked sub-blocks by a total number of sub-blocks.

In many more embodiments, the process 800 can determine an angle of blockage of the blocked area (block 820). In further embodiments, the angle of blockage of the obstructions may indicate an apparent size of the obstruction measured in degrees. In various embodiments, the apparent size of the obstruction may be an angular size of the obstruction determined based on an actual size of the object and a distance to the object.

In additional embodiments, the process 800 may also determine a center and a width of the blocked area (block 830). The process 800 can further generate the measured blockage data that indicates the center and the width of the blocked area. In many embodiments, the process 800 can determine the width and the center of the blocked area based on one or more coordinates of the blocked area with respect to the sky view. The width and center of the blocked area may be expressed in form of coordinates or in form of pixels.

Although a specific embodiment for determining the extent of the blocked area for carrying out the various steps, processes, methods, and operations described herein is discussed with respect to FIG. 8, any of a variety of systems and/or processes may be utilized in accordance with embodiments of the disclosure. In many non-limiting examples, the process 800 may accurately determine the extent of the blocked area including the center and the width of the blocked area. The elements depicted in FIG. 8 may also be interchangeable with other elements of FIGS. 1-7 and 9-10 as required to realize a particularly desired embodiment.

Figure 9:
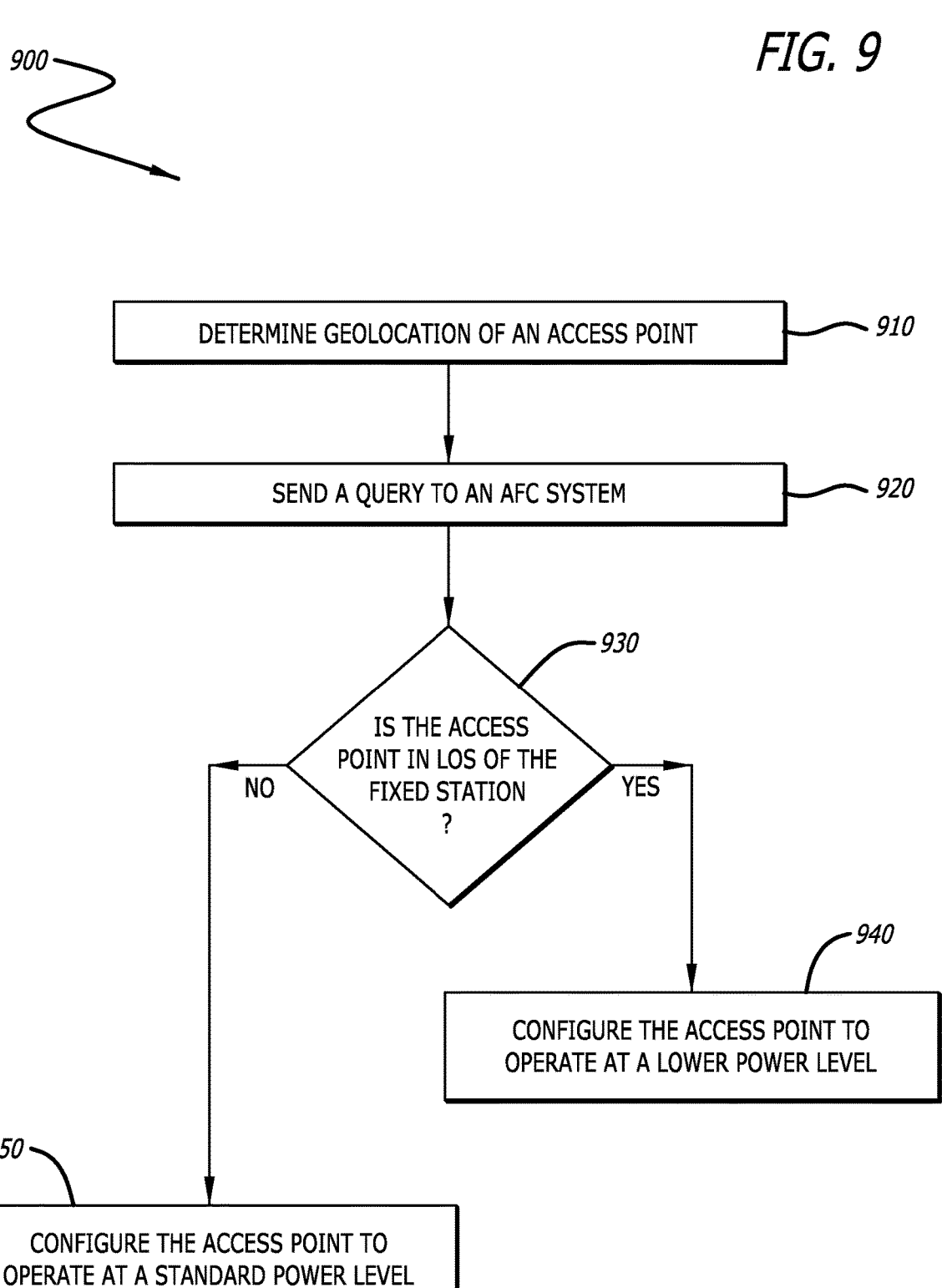
FIG. 9 is a flowchart depicting a process for configuring an output power of an access point in accordance with various embodiments of the disclosure.

Referring to FIG. 9, a flowchart depicting a process 900 for configuring the output power of an access point (AP) in accordance with various embodiments of the disclosure is shown. The process 900 may determine the geolocation of the AP (block 910). In many embodiments, the AFC may be required to control an operating frequency and the output power of the AP. In further embodiments, the AP can include the GNSS receiver to determine the geolocation of the AP.

In additional embodiments, the process 900 can send the query to the AFC (block 920). In many embodiments, the AFC may be integrated into the AP. In various non-limiting examples, the AFC can be an integrated AFC which is physically built into the same device as the AP. That is, the AFC functionality may be a part of the AP hardware or software, and the AFC and AP may work seamlessly together without any external connections. In more embodiments, the AFC can be in communication with the AP. In still more embodiments, the AFC and the AP may be separate devices, which can communicate with each other by way of wired or wireless communication links.

In still further embodiments, the process 900 may determine whether the AP is in the LOS of the fixed station (block 930). The process 900 may utilize at least one of: the geolocation of the AP, the geolocation of the fixed station, the GNSS data, or the LiDAR data. In many examples, the AP can be in the LOS of the fixed station if there is no obstruction between the AP and the fixed station. Consequently, the AP may not be in the LOS of the fixed station if there is one or more obstruction between the AP and the fixed station.

If the AP is in the LOS of the fixed station, one or more signals transmitted by the AP may reach the fixed station, thereby causing interference in the operation of the fixed station which operates on same frequencies. Consequently, the one or more signals transmitted by the fixed station may also reach the AP, thereby interfering in the operation of the AP which operates on the same frequencies. That is, operation of either, the AP or the fixed station on the same frequencies can cause interference. In many embodiments, the process 900 may configure the AP to operate at a lower power level (block 940). Since the AP operates at the lower power level, the operation of the AP does not interfere with the operation of the fixed station.

However, if the AP is not in the LOS of the station, the AP and the fixed station can operate on the same frequencies without causing interference in the operations of each other. The process 900 can configure the AP to operate at a higher power level (block 950). Since the AP is not in the LOS of the fixed station, even the signals transmitted by the AP at the higher power level cannot reach the fixed station. As a result, operating the AP at the higher power level may not interfere with the operation of the fixed station when the AP and the fixed station are not in the LOS.

Although a specific embodiment for configuring the output power of an access point for carrying out the various steps, processes, methods, and operations described herein is discussed with respect to FIG. 9, any of a variety of systems and/or processes may be utilized in accordance with embodiments of the disclosure. In many non-limiting examples, the process 900 can avoid the interference between the AP and the fixed stations based on whether the AP in the LOS of the fixed station. The elements depicted in FIG. 9 may also be interchangeable with other elements of FIGS. 1-8 and 10 as required to realize a particularly desired embodiment.

Figure 10:
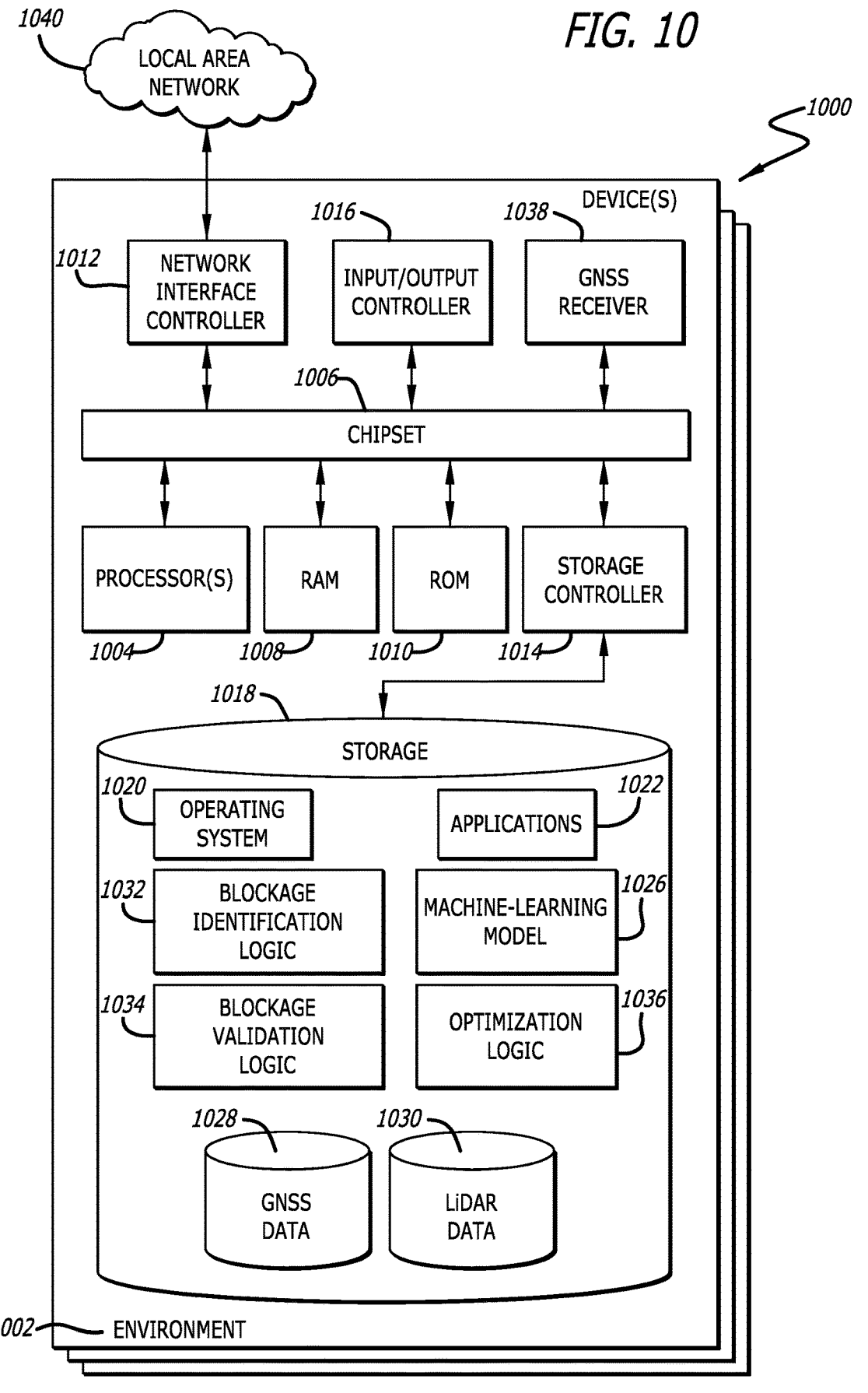
FIG. 10 is a conceptual block diagram of a device suitable for configuration with a blockage identification logic, a blockage validation logic, and an optimization logic in accordance with various embodiments of the disclosure.

Referring to FIG. 10, a conceptual block diagram of a device 1000 suitable for configuration with a blockage identification logic, a blockage validation logic, and an optimization logic in accordance with various embodiments of the disclosure is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many non-limiting examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, applications 1022, GNSS data 1028 and LiDAR data 1030 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiments, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In further embodiments, the device 1000 may include a blockage identification logic 1032, a blockage validation logic 1034, and an optimization logic 1036. In many embodiments, the blockage identification logic 1032, the blockage validation logic 1034, and the optimization logic 1036 can be stored on the same storage 1018. The blockage identification logic 1032, the blockage validation logic 1034, and the optimization logic 1036 can be configured to perform one or more of the various steps, processes, operations, and/or other methods that are described above. Often, the blockage identification logic 1032, the blockage validation logic 1034, and the optimization logic 1036 can be a set of instructions stored within a non-volatile memory that, when executed by the processor(s)/controller(s) 1004 can carry out these steps, etc. In some embodiments, the blockage identification logic 1032, the blockage validation logic 1034, and the optimization logic 1036 may be a client application that resides on a network-connected device, such as, but not limited to, a server, switch, personal or mobile computing device in a single or distributed arrangement. In certain embodiments, the blockage identification logic 1032, the blockage validation logic 1034, and the optimization logic 1036 can control the output power of the AP based on whether the AP is the LOS of the fixed device.

In many embodiments, the device 1000 can include at least one GNSS receiver 1038. In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

In a number of embodiments, the storage 1018 can include the GNSS data 1028 received from the satellites by the GNSS receiver 1038. The GNSS data may be utilized to determine the geolocation of the device 1000. The GNSS data 1028 may also be utilized to generate the measured blockage data. In further embodiments, the storage 1018 can include LiDAR data 1030. The LiDAR data 1030 may include the high-resolution digital elevation models corresponding to the geolocation of the device 1000. The LiDAR data 1030 may be utilized to correct the geolocation of the device 1000. The LiDAR data may also be utilized to determine if the device 1000 is in the LOS of the fixed station. The GNSS data 1028 and the LiDAR data 1030 aid in improving the accuracy of the geolocation and the determination of the LOS of the device 1000.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to learn the pattern of the client traffic flow of various network devices and generate predictions as to which neighboring or sibling AP would be best to transfer the client to in the event of initiating a lower-power mode. Conversely, the ML model 1026 can be configured to determine which clients would be best suited for re-association with the AP or network device when it exits the lower-power mode.

The ML model(s) 1026 can be configured to generate inferences to make predictions or draw conclusions from data. An inference can be considered the output of a process of applying a model to new data. This can occur by learning from at least the GNSS data 1028 and the LiDAR data 1030 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for a device suitable for configuration with a blockage identification logic, a blockage validation logic, and an optimization logic for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of network devices or APs such that each device or AP acts as the AFC. The elements depicted in FIG. 10 may also be interchangeable with other elements of FIGS. 1-9 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory communicatively coupled to the processor;
   at least one global navigation satellite system (GNSS) receiver configured to receive GNSS data from a plurality of satellites observed over a predetermined time period;
   a blockage identification logic, configured to:
     receive a sky view indicative of an observable area of sky;
     divide the sky view into a plurality of sub-blocks;
     map the GNSS data on each of the plurality of sub-blocks;
     identify a first set of sub-blocks that are devoid of the GNSS data;
     cluster the first set of sub-blocks to generate clustered data; and
     generate measured blockage data based on the clustered data, wherein the measured blockage data is indicative of an area of sky devoid of observed satellites; and
   a blockage validation logic, configured to:
     receive a geolocation of a fixed station and a geolocation of the device;
     retrieve a predetermined blockage data from a light detection and ranging (LiDAR) database based on the geolocation of the device;
     determine whether the fixed station is in a line-of-sight (LOS) of the device based on a direction of blockage and the geolocations of the fixed station and the device.

2. The device of claim 1, the blockage validation logic is further configured to:

map the measured blockage data on the predetermined blockage data; and identify a direction of blockage based on the mapping.

3. The device of claim 2, further comprising an optimization logic, configured to:

retrieve LiDAR data corresponding to the sky view from a LiDAR database;

determine one or more blockages based on the retrieved LiDAR data; and identify a second set of sub-blocks corresponding to the determined blockages, wherein the clustered data is generated based on the first set of sub-blocks and the second set of sub-blocks.

4. The device of claim 3, wherein the LiDAR data includes high-resolution digital elevation models corresponding to the geolocation of the device.

5. The device of claim 3, wherein the GNSS receiver is further configured to provide the geolocation of the device based on the GNSS data.

6. The device of claim 5, wherein the GNSS receiver corrects the geolocation of the device based on the LiDAR data.

7. The device of claim 3, wherein the blockage validation logic and the optimization logic are implemented by a server.

8. The device of claim 1, wherein the blockage identification logic is further configured to:

determine a blocked area based on the clustered sub-blocks;

determine an angle of blockage of the blocked area; and determine a center and a width of the blocked area based on the angle of blockage, wherein the measured blockage data is indicative of the center and width of the blocked area.

9. The device of claim 1, wherein clustering the first set of sub-blocks to generate the clustered data utilizes agglomerative hierarchical clustering process.

10. The device of claim 1, wherein a number of sub-blocks depends on a processing power of the device.

11. The device of claim 2, wherein an output power of the device is controlled based on whether the device is in the LOS of the fixed station.

12. The device of claim 11, wherein the output power of the device when the device is not in the LOS of the fixed station is higher than the output power of the device when the device is in the LOS of the fixed station.

13. A method comprising:

receiving global navigation satellite system (GNSS) data from a plurality of satellites observed over a predetermined time period;

receiving a sky view indicative of an observable area of sky;

dividing the sky view into a plurality of sub-blocks;

mapping the GNSS data on each of the plurality of sub-blocks;

identifying a first set of sub-blocks that are devoid of the GNSS data;

clustering the first set of sub-blocks to generate clustered data;

generating measured blockage data based on the clustered data, wherein the measured blockage data is indicative of an area of sky devoid of observed satellites;

receiving a geolocation of a fixed station and a geolocation of a device;

retrieving a predetermined blockage data from a light detection and ranging (LiDAR) database based on the geolocation of the device;

determining whether the fixed station is in a line-of-sight (LOS) based on a direction of blockage and the geolocations of the fixed station and the device.

14. The method of claim 13, further comprising:

mapping the measured blockage data on the predetermined blockage data;

identifying the direction of blockage based on the mapping.

15. The method of claim 14, further comprising:

retrieving LiDAR data corresponding to the sky view from a LiDAR database;

determining one or more blockages based on the retrieved LiDAR data; and identifying a second set of sub-blocks corresponding to the determined blockages, wherein the clustered data is generated based on the first set of sub-blocks and the second set of sub-blocks.

16. The method of claim 15, wherein generating the measured blockage data comprises:

determining a blocked area based on the clustered sub-blocks;

determining an angle of blockage of the blocked area; and determining a center and a width of the blocked area based on the angle of blockage, wherein the measured blockage data is indicative of the center and width of the blocked area.

17. A device comprising:

a processor;

a memory communicatively coupled to the processor;

a blockage identification logic, configured to:

receive a sky view indicative of an observable area of sky;

receive global navigation satellite system (GNSS) data from a plurality of satellites observed over a predetermined time period;

map the GNSS data on the sky view; and generate measured blockage data based on the mapped GNSS data, wherein the measured blockage data is indicative of an area of sky devoid of observed satellites; and a blockage validation logic, configured to:

receive a geolocation of a fixed station and a geolocation of the device;

retrieve a predetermined blockage data from a light detection and ranging (LiDAR) database based on the geolocation of the device;

map the measured blockage data on the predetermined blockage data; and determine whether the fixed station is in a line-of-sight (LOS) of the device based on the mapped blockage data and the geolocations of the fixed station and the device.

18. The device of claim 17, wherein the measured blockage data is generated based on LiDAR data retrieved from a LiDAR database based on the geolocation of the device.

19. The device of claim 18, wherein the measured blockage data is indicative of a center and a width of the area of sky devoid of observed satellites.

20. The device of claim 19, wherein the geolocation of the device is corrected based on the LiDAR data.

* * * * *